(12) United States Patent
Van Duijvendijk

(10) Patent No.: US 9,846,976 B2
(45) Date of Patent: Dec. 19, 2017

(54) ASSESSING REMAINING USEFUL LIFE FOR PORTIONS OF WIND TURBINE SUPPORT STRUCTURES

(75) Inventor: Marcel Van Duijvendijk, Hengelo (NL)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 843 days.

(21) Appl. No.: 13/984,102

(22) PCT Filed: Feb. 8, 2012

(86) PCT No.: PCT/DK2012/050049
§ 371 (c)(1),
(2), (4) Date: Oct. 21, 2013

(87) PCT Pub. No.: WO2012/107051
PCT Pub. Date: Aug. 16, 2012

(65) Prior Publication Data
US 2014/0039807 A1    Feb. 6, 2014

Related U.S. Application Data

(60) Provisional application No. 61/440,426, filed on Feb. 8, 2011.

(51) Int. Cl.
*G07C 3/00* (2006.01)
*F03D 17/00* (2016.01)

(52) U.S. Cl.
CPC ............... *G07C 3/00* (2013.01); *F03D 17/00* (2016.05); *F05B 2240/912* (2013.01);
(Continued)

(58) Field of Classification Search
None
See application file for complete search history.

(56) References Cited

U.S. PATENT DOCUMENTS 7,895,016 B2 *    2/2011    Vittal .................. F03D 11/0091
290/44
2003/0127862 A1    7/2003    Weitkamp
(Continued)

FOREIGN PATENT DOCUMENTS

DE         19713583 A1    10/1998
DE    102005011256 A1     9/2006
(Continued)

OTHER PUBLICATIONS

Seidel, et al; Measuring Fatigue Loads of Bolts in Ring Flange Connections; European Wind Energy Conference (EWEC); Jul. 2, 2001.
(Continued)

*Primary Examiner* — Manish S Shah
*Assistant Examiner* — Renee I Wilson
(74) *Attorney, Agent, or Firm* — Patterson + Sheridan, LLP

(57) ABSTRACT

Methods for assessing the useful life that may remain for a portion of a wind turbine support structure. The methods may include identifying an overall expected useful life for the portion of the support structure and estimating an expended life from the extent of loading that has occurred to the portion of the support structure during the operative life of a wind turbine. The useful life remaining for the portion may be determined by subtracting the expended life from the overall expected useful life.

7 Claims, 2 Drawing Sheets

(52) U.S. Cl.
CPC ....... *F05B 2260/80* (2013.01); *F05B 2260/82* (2013.01); *F05B 2260/83* (2013.01); *F05B 2270/32* (2013.01); *F05B 2270/321* (2013.01); *F05B 2270/332* (2013.01); *Y02E 10/728* (2013.01)

(56) References Cited

U.S. PATENT DOCUMENTS

| | | | | |
|---|---|---|---|---|
| 2006/0070435 | A1* | 4/2006 | LeMieux | F03D 11/00 73/168 |
| 2010/0310373 | A1* | 12/2010 | Castell Martinez | F03D 11/00 416/61 |
| 2011/0091321 | A1* | 4/2011 | Baker | F03D 7/047 416/1 |

FOREIGN PATENT DOCUMENTS

| | | | |
|---|---|---|---|
| EP | 2267305 | A2 | 12/2010 |
| WO | 2010057972 | A2 | 5/2010 |

OTHER PUBLICATIONS

International Search Report and Written Opinion; PCT/DK2012/050049; dated Jun. 15, 2012.

* cited by examiner

ASSESSING REMAINING USEFUL LIFE FOR PORTIONS OF WIND TURBINE SUPPORT STRUCTURES

FIELD

The field is that of support structures, and particularly that of wind turbine support structures.

BACKGROUND

Wind turbines include a rotor driven by the wind to produce mechanical energy. The mechanical energy is converted to electrical energy and provided to a power grid, as represented in FIG. 1. The rotor and nacelle that supports the rotor among other heavy components are positioned high above the ground or sea by a support structure, typically including a tower and foundation. The nacelle and rotor may yaw about the tower to face the wind as the wind changes direction. The nacelle and rotor may also be yawed out of the wind when the wind turbine is not operating.

Wind turbine support structures may be designed with the intent that all portions of the structure have a useful service life that, at a minimum, is as long as the service life of the wind turbine, typically 20 to 25 years, when the turbine is loaded maximally. Wind turbines support structures, however, may be loaded during use in ways that cause stress and fatigue disproportionally throughout the structure.

SUMMARY

According to a first aspect, a method is disclosed for assessing useful life remaining for a portion of a wind turbine support structure. The method includes identifying an overall expected useful life for the portion of the support structure. An expended life is estimated from the extent of loading that has occurred to the portion of the support structure during the operative life of a wind turbine. The useful life remaining for the portion is assessed by subtracting the expended life from the overall expected useful life.

According to one embodiment, the overall expected useful life is identified from destructive testing of a blank that has been loaded minimally. According to other embodiments, identifying an overall expected useful life includes estimating an overall expected useful life from measurements taken from sensors positioned on the wind turbine support structure.

According to some embodiments, expended life is estimated from known wind directions and magnitudes for a location of the wind turbine support structure. The known wind directions and magnitudes may be taken while the wind turbine supported by the wind turbine support structure is operating, or otherwise.

According to another aspect, a method is disclosed for assessing useful life remaining for a portion of a wind turbine support structure. The method includes performing fatigue life testing of a blank that has been mounted to the portion of the support structure. Results of the fatigue life testing of the blank are assessed to determine useful life remaining of the portion.

These and other aspects of the invention will be appreciated from the following description and claims.

BRIEF DESCRIPTION OF THE FIGURES

The accompanying drawings are not intended to be drawn to scale. In the drawings, each identical or nearly identical component that is illustrated in various figures may be represented by a like numeral. For purposes of clarity, not every component may be labelled in every drawing. In the drawings.

DETAILED DESCRIPTION OF THE FIGURES AND VARIOUS EMBODIMENTS

Wind turbine support structures may be designed with the intent that all portions of the structure have a useful service life that, at a minimum, is as long as the service life of the wind turbine, typically 20 to 25 years, when the turbine is loaded maximally. Wind turbines support structures, however, may be loaded during use in ways that cause stress and fatigue disproportionally throughout the structure. This disproportionate stress may result in portions of the structure being loaded to lesser degree throughout the service life of a turbine, meaning that these portions may have enough useful service life remaining to warrant reuse, either as a portion of another wind turbine or other structure. Methods for assessing the useful life that remains for portions of a wind turbine support structure are described herein.

Figure 1:
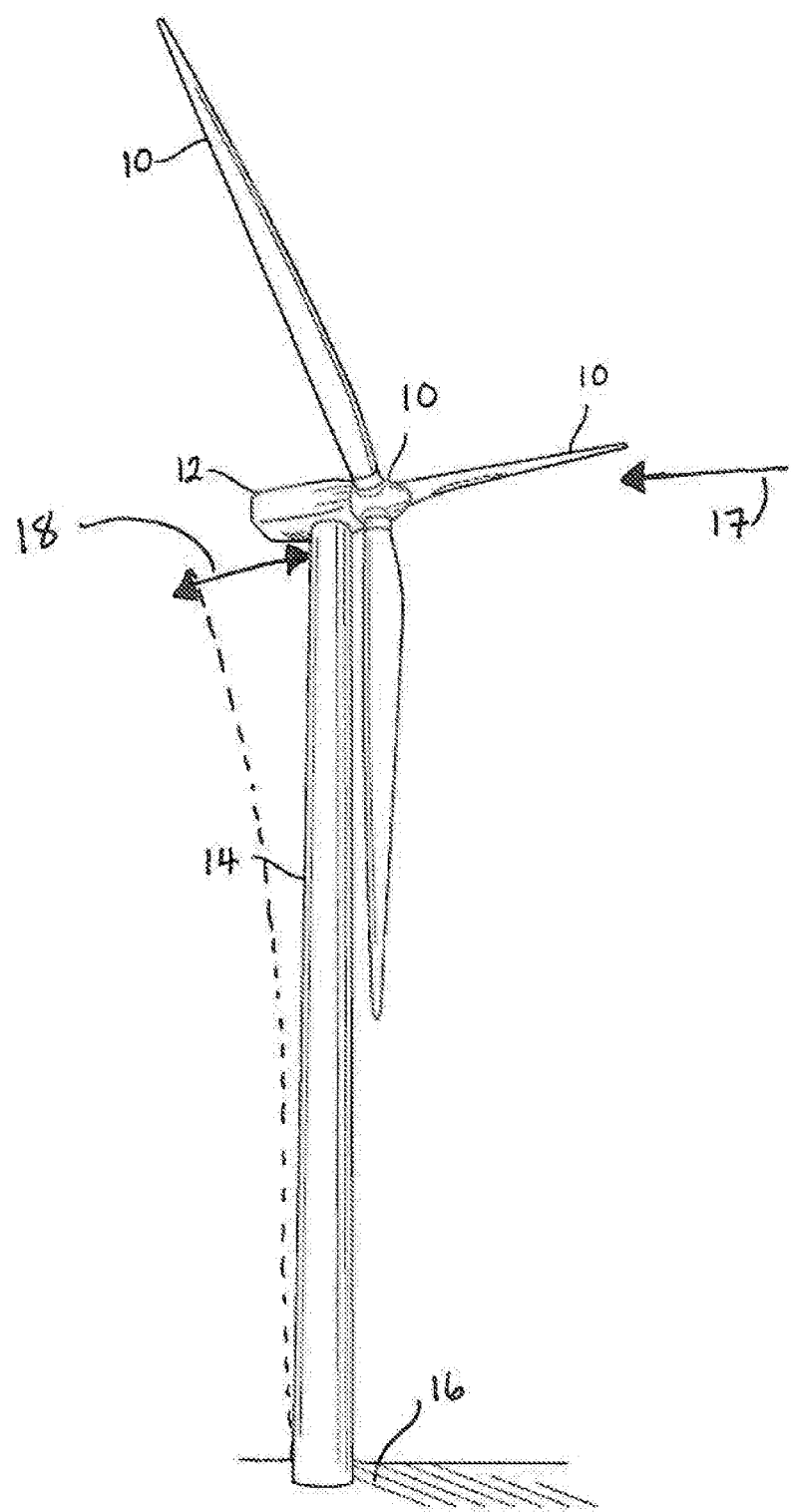
FIG. 1 shows a perspective view of a wind turbine schematically showing how a tower of the wind turbine may be loaded in a bending mode during operation.

Wind turbines include a rotor 10 driven by the wind to produce mechanical energy. The mechanical energy is converted to electrical energy and provided to a power grid, as represented in FIG. 1. The rotor, and other heavy components mounted to a nacelle 12, is positioned high above the ground or sea by a support structure, typically including a tower 14 and foundation 16. The nacelle and rotor may yaw about the tower to face the wind 17 as the wind changes direction. The nacelle and rotor may also be yawed out of the wind when the wind is not operating.

The tower structure of a wind turbine may be loaded in complex manners as the turbine is operated, due to the various forces associated with the rotating rotor and other moving components in the turbine. The greatest load, however, is most typically associated with tower bending forces that result from the thrust force of the wind against the rotor. As is to be appreciated, wind incident to the rotor causes both a tangential force, which serves to rotate the rotor about the rotor axis, and a thrust force, the resultant of which urges the rotor toward the nacelle in a direction parallel to the rotor axis. The thrust force is received by bearings and, in turn, the support structure of the wind turbine. Thrust forces ultimately causes bending forces in wind turbine tower, as represented schematically in FIG. 1.

In bending, as represented in FIG. 1 by arrow 18, upwind portions of the tower are placed in tension and downwind portions are placed in compression. Portions that lie along the neutral axis of bending are loaded to a much lower degree, and may not be loaded in bending at all along the neutral axis. As the wind changes or gusts, the magnitude of the bending force applied to the tower may change, causing the tower to sway or oscillate in bending. In strong gusts, the tower may even move through modes of fully reversed bending, where the upwind portions of the tower are momentarily placed in compression and the downwind side is placed in tension, further stressing these portions of the tower structure while those at or near the neutral axis are stressed minimally by the bending forces.

The applicant has appreciated that uneven loading of portions of a wind turbine tower (or other wind turbine support structure) may cause the more highly loaded portions to near the end of their useful life more quickly, relative to other portions. The applicant has also appreciated that the portions of the wind turbine tower that have been loaded less may have remaining useful life when the overall wind turbine is decommissioned, and may be reused in the construction another wind turbine tower or other structure. With the above in mind, the applicant describes several approaches that may be used to identify or estimate the useful life that remains for portions of a wind turbine tower to, in turn, help assess whether and for what purposes various portions of a wind turbine tower may be reused.

Figure 2:
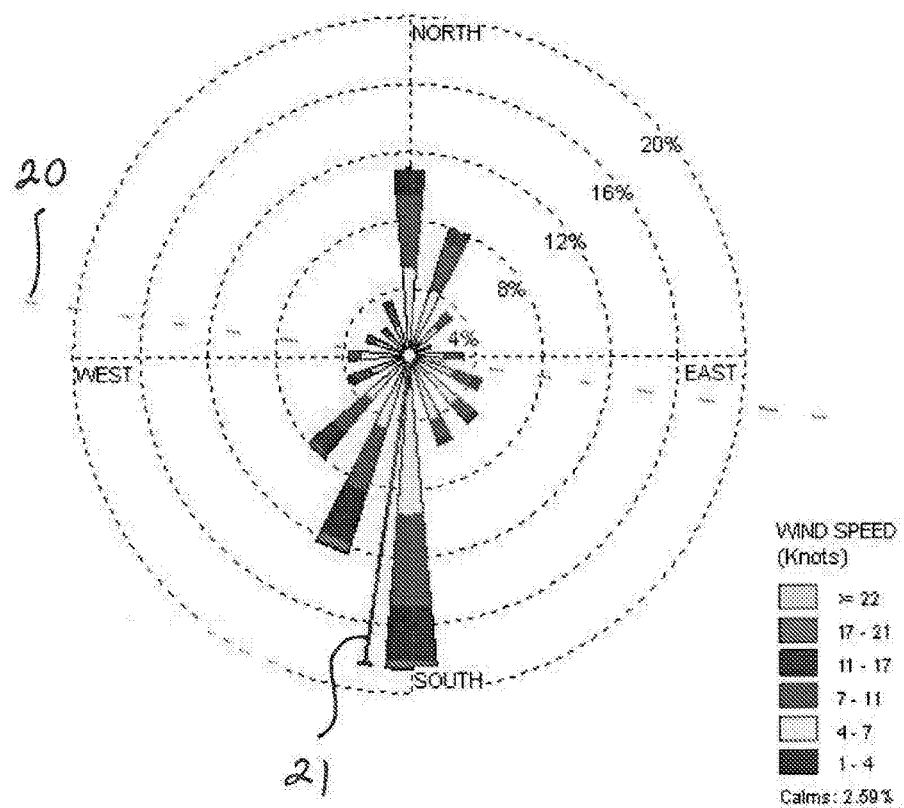
FIG. 2 shows a wind rose that includes representations of wind records for a particular location where a wind turbine may be sited, including wind direction and magnitude.

FIG. 2 is a wind rose that includes representations of wind records for a particular location where a wind turbine may be sited, including wind direction and magnitude. The wind rose, superimposed over a cross-section of a wind turbine tower, may identify the circumferential portions of the tower exposed to greater stresses due to bending. The wind rose additionally may identify circumferential portions of the tower most often positioned on or near the neutral axis 20 as the tower is placed in bending—sections which should typically have greater useful life remaining, at least as compared to other portions of the tower, such as those that lie on or near a resultant vector of the wind rose 21.

Data used to create a wind rose may be collected through various techniques. According to some embodiments, data is collected by a wind measurement device located at a wind turbine site prior to the construction of the wind turbine. This data may be used to predict or provide an idea as to the wind conditions that a turbine at a particular site may experience. Additionally or alternatively, measurements of actual wind conditions may be collected during actual operation of a wind turbine and used to assess the extent of stress/fatigue to which a tower has been subjected. This data may come from actual measurement of the wind itself, or through a surrogate such as the power produced at various yaw positions over the life of a wind turbine. It is to be appreciated that wind data may be collected through other approaches as well, and that the above description is not to be considered limiting in this respect.

According to other embodiments, sensors may be placed into the wind turbine support structure or other portions of the tower to make direct measurements of the loads and loading cycles experienced over the operative life of a wind turbine. These sensors may include strain gages bonded at different intervals about the tower structure, or other sensors capable of sensing stress or strain, either directly or indirectly. In such embodiments, the remaining useful life for portions of the support structure may be determined by subtracting the fatigue life that has been expended during operation of the support structure from an overall expected useful life. The overall expected useful life may be determined theoretically, through initial testing of the material used to construct the support structure, or through other approaches.

Destructive testing may also be performed to estimate the remaining useful life of structural components. Blanks may be created from different portions of a tower, during or after wind turbine decommissioning, and subjected to cyclic load tests to identify the onset of fatigue. The number of cycles required to reach fatigue failure may be used to estimate remaining useful life for portions of the tower that have experiences similar loading as that from which the blank was taken. According to some embodiments, fatigue tests may be performed from blanks made from the same material used to construct a tower and that have not been subjected to much loading. Such blanks may be set aside at tower construction or taken from a portion of a tower that is expected to have experienced little or no fatigue. Results from fatigue tests blanks with no or little fatigue history may provide an additional data point for assessing remaining useful life of portions of a support structure.

Sacrificial blanks may be incorporated into a tower structure for later destructive testing to determine remaining useful life. By way of example, a material with a known fatigue life such as steel, concrete, and the like, may be bonded or otherwise fastened to a different portion of a tower, such that the blank experiences similar compressive and tensile load profiles as the portion of the support structure. At tower decommissioning, the remaining fatigue life of the sacrificial blank may be determined, such as through destructive fatigue testing. Knowledge of the remaining fatigue life of the blank in combination with the expected overall fatigue life of the sacrificial blank may be used to estimate the fatigue that was experienced by the corresponding portion of the tower so that the remaining useful life that may be estimated through interpolation or extrapolation.

The various embodiments described herein may be used with different types of tower constructions and materials. By way of example, these techniques and variants thereof may be used to assess the remaining useful life for concrete, steel, iron, aluminum, wood, and other materials that may be used to construct a supporting structure for a wind turbine. It is also to be appreciated that the techniques described herein may be applied to different types of wind turbine support structures, including but not limited to lattice towers, cylindrical steel towers, concrete towers, wood timber towers, and the like. It is also to be appreciated that, although some embodiments are described with respect to a wind turbine tower, that the same embodiments may also apply to other supporting structures such as foundations, soil piles, transition pieces, and the like.

The above-described embodiments of various methods that may be used to control the wind turbine or portions thereof can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. That is, one single controller or multiple controllers may be used to execute the control schemes described herein with respect to the blade angle controller, the pump control, the motor/generator controller and/or the turbine controller. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of any one of the embodiments described herein comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments described herein wherein processes are implemented in a computer readable medium, the computer implemented processes may, during the course of their execution, receive input manually (e.g., from a user).

The phraseology and terminology used herein is for the purpose of description and should not be regarded as limiting. The use of "including", "comprising", "having", "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of this description invention. Accordingly, the foregoing description is by way of example only, and is not intended as limiting. The invention(s) are limited only as defined by the following claims and the equivalents thereto. Accordingly, the foregoing description and drawings are by way of example only.

It should be understood that aspects of the invention are described herein with reference to the figures, which show illustrative embodiments in accordance with aspects of the invention. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method of assessing useful life remaining for a portion of a wind turbine support structure, comprising:
    removing a physical blank from the wind turbine support structure at a location of the wind turbine support structure that is expected to experience minimal fatigue;
    performing destructive testing on the removed physical blank to determine fatigue life data for the removed physical blank;
    identifying an overall expected useful life for the portion of the wind turbine support structure, based on the determined fatigue life data for the removed physical blank;
    estimating an expended life for the portion of the wind turbine support structure from an extent of loading that has occurred to the portion of the wind turbine support structure during the operative life of a wind turbine; and
    assessing the useful life remaining for the portion of the wind turbine support structure, by subtracting the expended life from the overall expected useful life.

2. The method of claim 1, wherein identifying includes estimating the overall expected useful life from measurements taken from sensors positioned on the wind turbine support structure.

3. The method of claim 1, wherein estimating includes estimating expended life from known wind directions and magnitudes for a location of the wind turbine support structure.

4. The method of claim 3, wherein the known wind directions and magnitudes are taken while the wind turbine supported by the wind turbine support structure is operating.

5. The method of claim 1, wherein the physical blank is made from the same material used to construct the wind turbine support structure.

6. A method of assessing useful life remaining for a portion of a wind turbine support structure, comprising:
    receiving fatigue life testing data of a physical blank that has been mounted to the portion of the wind turbine support structure to determine a remaining fatigue life of the physical blank;
    estimating fatigue experienced by the portion of the wind turbine support structure based on the remaining fatigue life of the physical blank and an expected overall fatigue life of the physical blank; and
    estimating the useful life remaining for the portion of the wind turbine support structure using one of interpolation and extrapolation based on the estimated fatigue experienced by the portion of the wind turbine support structure.

7. The method of claim 6, wherein the physical blank is made from a material with a known expected overall fatigue life.

* * * * *